(12) United States Patent
Lilly

(10) Patent No.: US 12,436,449 B2
(45) Date of Patent: Oct. 7, 2025

(54) ADJUSTABLE UNDERWATER CAMERA SYSTEM

(71) Applicant: Matthew P. Lilly, Stuart, FL (US)

(72) Inventor: Matthew P. Lilly, Stuart, FL (US)

( * ) Notice: Subject to any disclaimer, the term of this patent is extended or adjusted under 35 U.S.C. 154(b) by 159 days.

(21) Appl. No.: 18/438,049

(22) Filed: Feb. 9, 2024

(65) Prior Publication Data
US 2025/0258424 A1    Aug. 14, 2025

(51) Int. Cl.
| | | |
|---|---|---|
| G03B 17/56 | (2021.01) | |
| B63B 17/00 | (2006.01) | |
| G03B 17/08 | (2021.01) | |
| H04N 7/18 | (2006.01) | |
| H04N 23/51 | (2023.01) | |

(52) U.S. Cl.
CPC ............ *G03B 17/561* (2013.01); *B63B 17/00* (2013.01); *G03B 17/08* (2013.01); *H04N 7/185* (2013.01); *H04N 23/51* (2023.01); *B63B 2017/0054* (2013.01)

(58) Field of Classification Search
CPC .............................. G10K 11/006; G03B 17/08
See application file for complete search history.

(56) References Cited

U.S. PATENT DOCUMENTS 6,762,790 B1 *   7/2004   Matko .................... F16M 11/10
                                                         396/428

FOREIGN PATENT DOCUMENTS

| AU | 2021101559 A4 * | 5/2021 | ............. H04N 23/54 |
| KR | 102261847 B1 * | 6/2021 | ............. H04N 23/57 |

\* cited by examiner

*Primary Examiner* — Leon W Rhodes, Jr.
(74) *Attorney, Agent, or Firm* — Clay McGurk; The Law Office of CLay McGurk

(57) ABSTRACT

What is provided is an adjustable and specialized underwater observation system, crafted for the precise detection of fish, plant life and aquatic organisms. The system is designed specifically for mounting to a transom of an aquatic vehicle to ensure optimal submersion and stability. Complementing this system is a strategically positioned video display device that vividly presents the underwater imagery captured by the solid-state imager. This transom-mounted camera system provides an integrated and effective solution for immersive underwater exploration and observation.

9 Claims, 3 Drawing Sheets

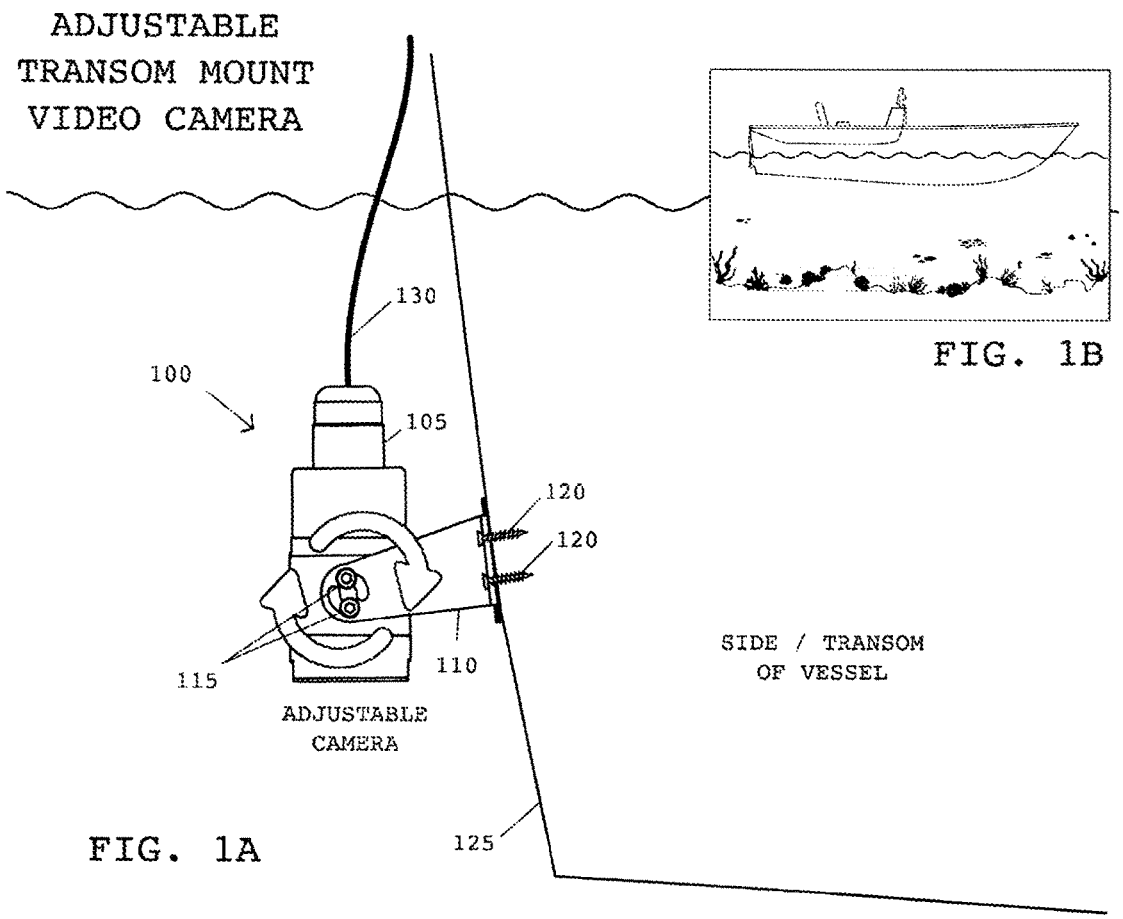
FIG. 1A
FIG. 1B
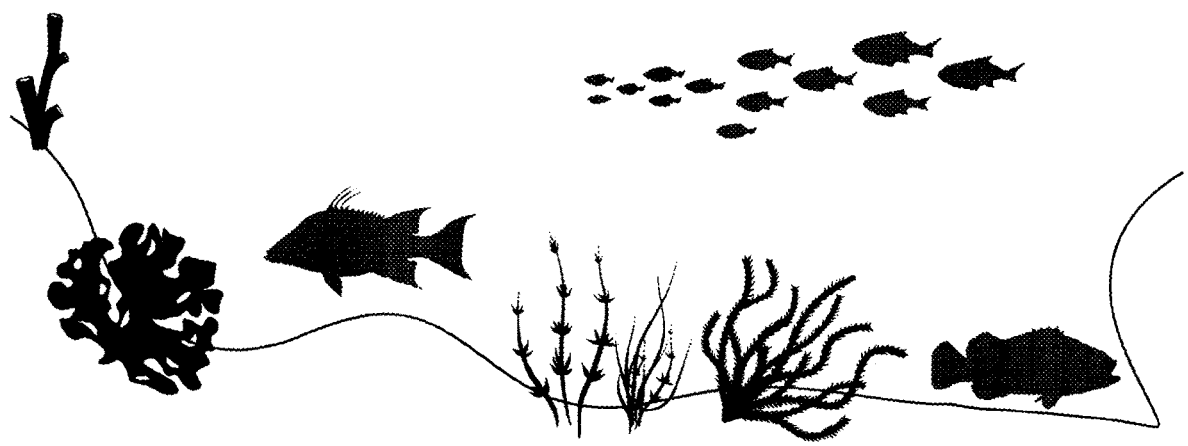

ADJUSTABLE BRACKET
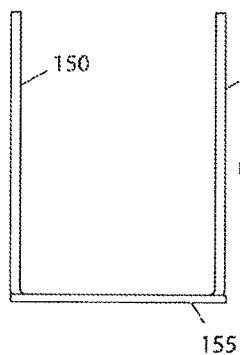
FIG. 4
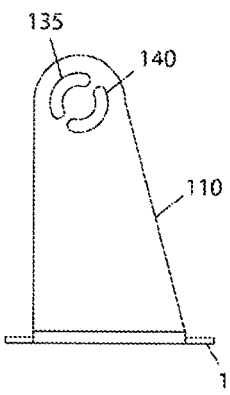
FIG. 5
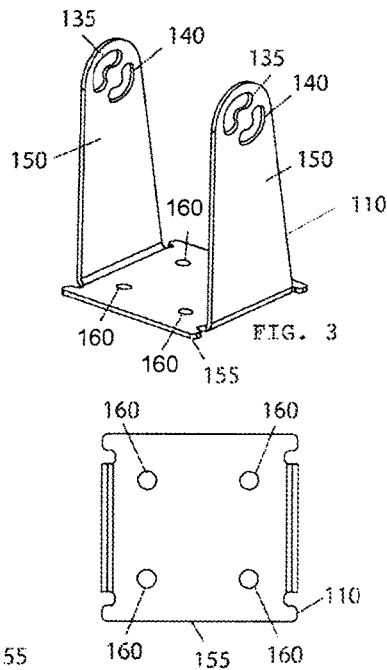
FIG. 3
FIG. 6
ADJUSTABLE BRACKET WITH CAMERA ASSEMBLY
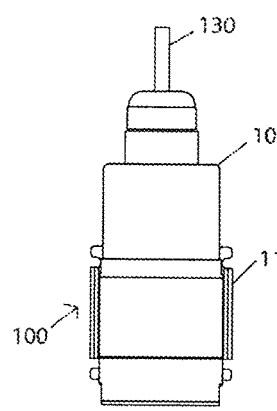
FIG. 7
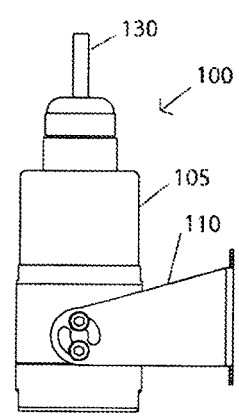
FIG. 8
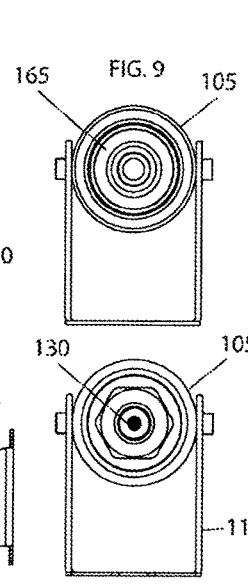
FIG. 9
FIG. 10
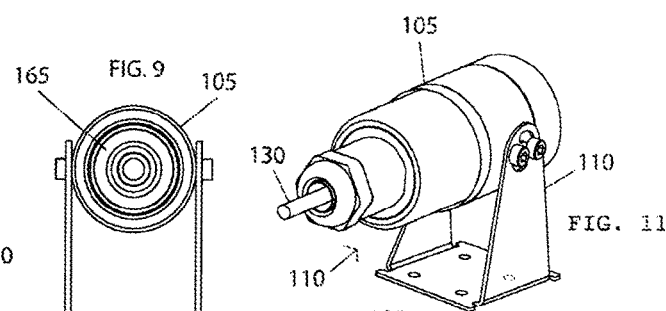
FIG. 11
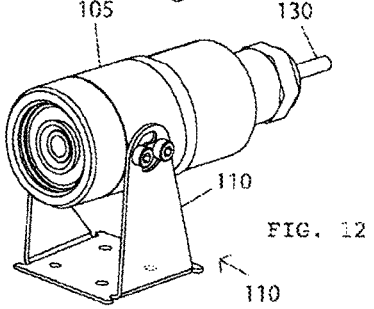
FIG. 12

ADJUSTABLE UNDERWATER CAMERA SYSTEM

FIELD OF THE INVENTION

This application relates to underwater camera systems and more particularly to underwater camera systems connected to the transom of an aquatic vehicle, such as a canoe, boat, ship and/or yacht.

BACKGROUND OF THE INVENTION

For aquatic vehicle operators, viewing life underwater is a challenge without using some type of underwater camera system. Many underwater camera systems that are attached to aquatic vehicles suffer from vibration and/or camera movement which results in the loss of visual acuity of seeing underwater when the aquatic vehicle is moving. What is needed is an underwater camera system that helps to maintain visual acuity while the boat is moving at slow speeds.

BRIEF SUMMARY OF THE INVENTION

The present invention uses a novel and new bracket to attach a camera system to the transom of an aquatic vehicle such as a canoe, boat, ship and/or yacht. The camera system is adjustable on bracket by rotating the camera system and tightening the hex-end screws. The bracket provides flexibility in positioning the camera system on the back of an aquatic vehicle via the semi-circular slots or holes on the sides of the bracket.

The underwater camera system incorporates a waterproof body housing with a self-contained camera. This camera system ensures safe and dependable underwater video capture and adjustability. Users can easily mount the camera system on the transom of the aquatic vehicle, offering a dynamic solution for enhanced visibility in aquatic environments. The camera system can easily interface via a waterproof cable to one or more televisions or displays on a computer, a tablet and/or a phone to provide a seamless and protected viewing experience. Users can use the displays to see fish and aquatic plant life below the surface of the water.

BRIEF DESCRIPTION OF THE DRAWINGS

FIGS. 1A and 1B illustrate an underwater camera system mounted to the transom of an aquatic vehicle according to an embodiment of the present invention.

FIG. 3 illustrates a perspective view of a bracket according an embodiment of the present invention.

FIG. 4 illustrates a front view of a bracket according to an embodiment of the present invention.

FIG. 5 illustrates a side view of a bracket according to an embodiment of the present invention.

FIG. 6 illustrates a bottom view of a bracket according to an embodiment of the present invention.

FIG. 7 illustrates a side view of the underwater camera system according to an embodiment of the present invention.

FIG. 8 illustrates a side view of the underwater camera system according to an embodiment of the present invention.

FIG. 9 illustrates a top view of the underwater camera system according to an embodiment of the present invention.

FIG. 10 illustrates a bottom view of the underwater camera system according to an embodiment of the present invention.

FIG. 11 illustrates a top perspective view of the underwater camera system according to an embodiment of the present invention.

FIG. 12 illustrates a bottom perspective view of the underwater camera system according to an embodiment of the present invention.

DETAILED DESCRIPTION OF THE INVENTION

Figure 2:
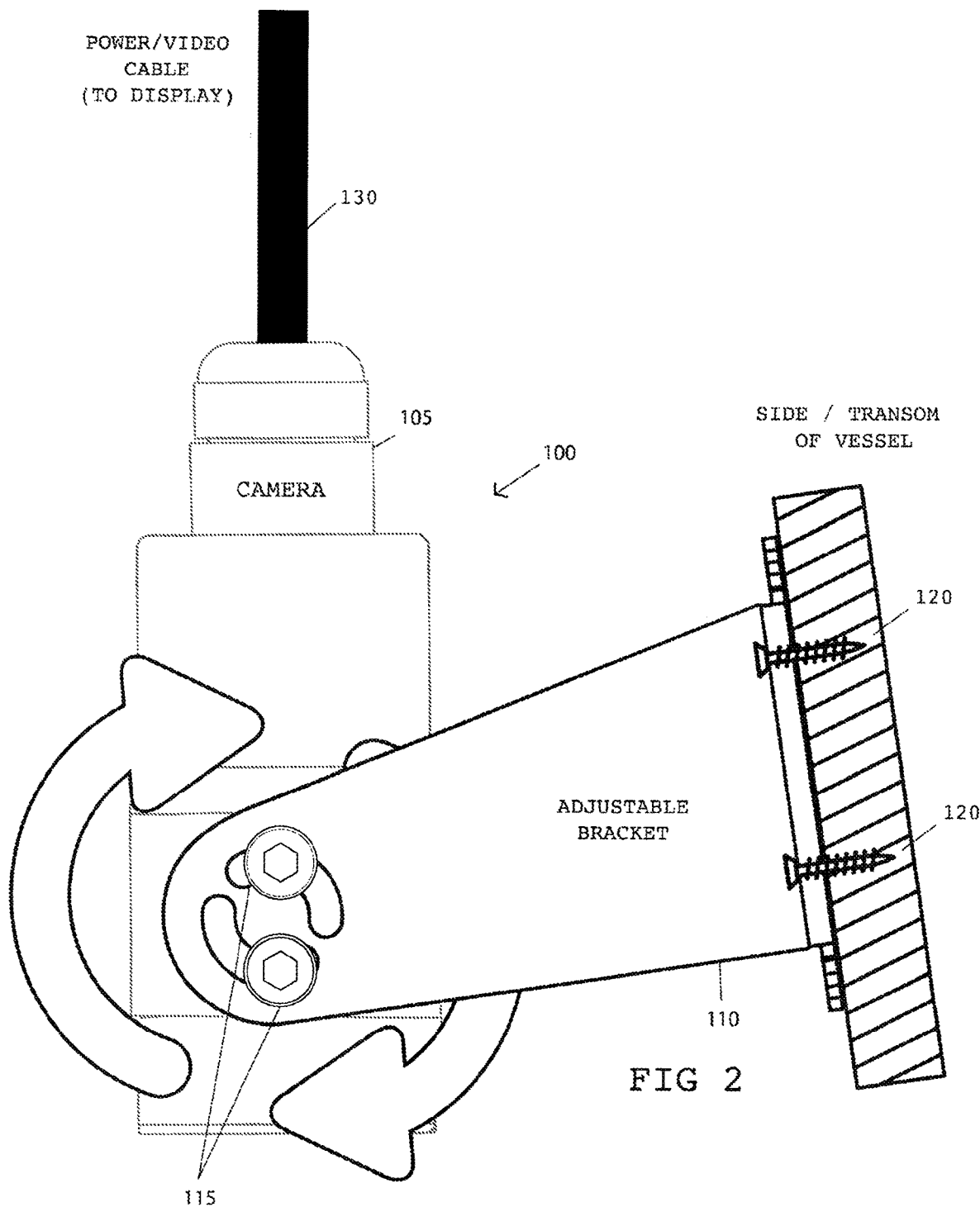
FIG. 2 illustrates an underwater camera system mounted to the transom of an aquatic vehicle according to an embodiment of the present invention.

FIG. 1A shows one embodiment of an underwater camera system 100 which comprises a water-proof camera 105, a three-sided or "U"-shaped bracket 110, hex-end screws 115, screws 120 for mounting the bracket 110 to the transom of a boat 125 and a cable 130. The underwater camera system 100 is mounted to the transom is an area below the waterline of the aquatic vehicle. It is preferred the underwater camera system 100 is mounted somewhere in an area above the bottom of the aquatic vehicle and below the waterline of the aquatic vehicle. The underwater camera system live streams a video-feed of aquatic life below the aquatic vehicle to one or more displays on the aquatic vehicle.

The underwater camera 105 can be any commercially available camera that is water-proof and is capable of being submerged in water for extended periods of time. The underwater camera 105 may be contained in water-proof housing or the camera 105 may be water-proof itself. The underwater camera 105 and/or housing has to have at least two threaded holes on opposite sides of the housing that correspond to the semi-circular slots or holes on opposite sides of the bracket 110, so that hex-end screws 115 can be inserted therein and securely hold the camera system 105 to the bracket 110. The hex-end screws 115 could be hex screws with a special design that cannot be rotated without a tool that matches such special design. Alternatively, any screws could be used that would not loosen (or unscrew) through vibration.

The hex-end screws 115 can be tightened at different areas of the slots or holes 135, 140 (see FIG. 3) on opposite sides of the bracket 110, so that the camera system 105 can be rotated to be perpendicular to the plane formed by the waterline, or at an angle as desired by the user. As shown in FIG. 1A, the underwater camera 105 is mounted in the vertical direction which is perpendicular to a plane or axis formed by the waterline. There are two hex-end screws 115 on each side that pass through the semi-circular slots 135, 140 (or holes) in the bracket 110 and are threaded or screwed into threaded holes in the underwater camera housing 105.

In alternative embodiments, one or more intervening holders could fit around the camera system and/or housing 105. An intervening holder would be capable of being tightened around the camera system 105 using any of the ways known in the art so that the camera system 105 and the intervening holder would be virtually inseparable. The intervening holder would have the necessary threaded holes so that the intervening holder (and thus camera system 105) align with the semi-circular slots or holes on the bracket 110.

The underwater camera 105 is powered and controlled via the cable 130 by a television, a computer, a tablet or other display. As shown in FIG. 1B, the cable 130 is attached to the underwater camera 105 and runs along the transom, through the hull, along the sides of the aquatic vehicle to the steering and control area of the vehicle. The computer (or other device) can drive the different features of the camera 105 such as light, focus and sharpness for example.

The width of the camera system 105 should fit inside the bracket 110 without overly bending the sides of the bracket 110 in the inward or outward direction. As shown in FIG. 2, the bracket 110 is attached, coupled or connected to a transom of an aquatic vehicle. The length of the screws 120 should be smaller than the thickness of the hull. For example, if the hull is ¾ inch, the screws 120 should be ½ inch. The screws 120 should be attached, coupled or attached to the transom using water-proof installation as known to those skilled in the art.

FIG. 3 illustrates a front perspective view of the bracket 110 according to one embodiment of the present invention. The bracket 110 comprises two sides 150 which are molded, attached, connected or coupled at the bottom end to a common bottom 155. Each of the two sides has two slots 135, 140 at the top end or the end opposite the bottom. The slots 135, 140 are partially semi-circular.

The bottom piece 155 comprises four circular holes 160, arranged in a 2×2 pattern or configuration where a screw 120 can be inserted therein and attached, coupled or connected to the transom. These screws 120 will hold the underwater camera system 100 to the aquatic vehicle 125. In alternative embodiments, there are alternative ways to attach the underwater camera system 100 to the acquatic vehicle. For example, there can be more holes or holes that have alternative shapes as known in the art, such as semi-circular holes for example.

FIG. 4 illustrates a front view of the bracket 110 according to one embodiment of the present invention. Bracket 110 comprises two sides 150 and a bottom 155, all formed or molded into one steel piece. Alternatively, the bracket can be made of any other metal or heavy-duty plastic, and should be covered with a coating to prevent rusting or degradation in salt water. The thickness of the bracket 110 should be durable and lasting for use in water.

FIG. 5 illustrates a side view of the bracket 110 according to one embodiment of the present invention. As shown in FIG. 5, there are two semi-circular slots 135, 140, where one slot 135 faces the other slot 140, like parentheses "(" and ")" for example.

FIG. 6 illustrates a bottom view of the bracket 110 according to one embodiment of the present invention. As shown in FIG. 6, there are four circular holes 160 arranged in a 2×2 pattern.

FIGS. 7-12 illustrate the adjustable underwater camera system 100 in different views.

FIG. 7 illustrates a side view of the adjustable underwater camera system 100 according to one embodiment of the present invention. FIG. 8 illustrates a side view of the adjustable underwater camera system 100 according to one embodiment of the present invention. FIG. 9 illustrates a bottom view of the adjustable underwater camera system 100 according to one embodiment of the present invention, where the lens 165 of the camera system is shown. FIG. 10 illustrates a top view of the adjustable underwater camera system 100 according to one embodiment of the present invention, where the cable 130 of the camera 105 is attached thereto. FIG. 11 illustrates a top perspective view of the adjustable underwater camera system 100 according to one embodiment of the present invention. FIG. 12 illustrates a bottom view of the adjustable underwater camera system 100 according to one embodiment of the present invention.

While the invention has been described in detail and with reference to specific embodiments thereof, it will be apparent to those skilled in the art that various changes and modifications can be made therein without departing from the spirit and scope thereof. Thus, it is intended that the present invention cover the modifications and variations of this invention provided they come within the scope of the appended claims and their equivalents.

What is claimed is:

1. An underwater camera system attached to a transom of an aquatic vehicle, comprising:
   a water-proof camera having at least two threaded camera holes on opposite sides of the camera;
   a "U"-shaped bracket having two semi-circular slots at each of the top ends of the bracket;
   four camera attachment screws that attach the "U"-shaped bracket to the water-proof camera, where one camera attachment screw fits through one of the semi-circular slots in the "U"-shaped bracket and is threaded into one of the threaded camera holes in the camera; and
   a plurality of bracket screws that fit through a plurality of bracket holes in the bottom of the bracket and into the transom;
   wherein the underwater camera system is mounted below a waterline of the aquatic vehicle and above a bottom of the aquatic vehicle.

2. The underwater camera system as in claim 1, wherein the bracket holes are circular.

3. The underwater camera system as in claim 1, wherein the bracket holes are arranged in a 2×2 configuration.

4. The underwater camera system as in claim 1, wherein the bracket holes are arranged in a configuration other than the 2×2 pattern.

5. The underwater camera system as in claim 1, further comprising a cable, where one end of the cable is connected to the water-proof camera.

6. The underwater camera system as in claim 5, wherein the other end of the cable is connected to one or more of a television, a computer display, a tablet display and a display.

7. The underwater camera system as in claim 5, wherein the cable is water-proof.

8. The underwater camera system as in claim 1, wherein the water-proof camera is capable of live-streaming a video-feed of aquatic life below the aquatic vehicle.

9. The underwater camera system as in claim 1, wherein the camera attachment screws are hex-end screws.

* * * * *